(12) United States Patent
Shashidhar et al.

(10) Patent No.: US 8,110,279 B2
(45) Date of Patent: Feb. 7, 2012

(54) METHOD FOR IMPROVING THE EDGE STRENGTH OF TEMPERED GLASS SHEET ARTICLES

(75) Inventors: Nagaraja Shashidhar, Painted Post, NY (US); Ljerka Ukrainczyk, Painted Post, NY (US); David Inscho Wilcox, Mansfield, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/903,426

(22) Filed: Oct. 13, 2010

(65) Prior Publication Data

US 2011/0129650 A1 Jun. 2, 2011

Related U.S. Application Data

(60) Provisional application No. 61/264,920, filed on Nov. 30, 2009.

(51) Int. Cl.
*B32B 15/00* (2006.01)
(52) U.S. Cl. .......................... 428/191; 428/410; 428/426
(58) Field of Classification Search .................. None
See application file for complete search history.

(56) References Cited

U.S. PATENT DOCUMENTS

| 5,674,790 A | 10/1997 | Araujo |
| 2009/0142568 A1 | 6/2009 | Dejneka et al. |
| 2009/0215607 A1 | 8/2009 | Gomez et al. |
| 2009/0220761 A1 | 9/2009 | Dejneka et al. |
| 2010/0035038 A1 | 2/2010 | Barefoot et al. |

*Primary Examiner* — Timothy Speer
(74) *Attorney, Agent, or Firm* — Robert P. Santandrea

(57) ABSTRACT

A tempered glass sheet article includes a glass sheet having a thickness t, at least one edge, and at least one surface. The at least one edge is connected to the at least one surface by an edge-to-surface corner. The edge-to-surface corner is rounded with a radius r and has a surface compression that is at least 78% of a surface compression measured at or near a center of the at least one surface.

10 Claims, 4 Drawing Sheets

METHOD FOR IMPROVING THE EDGE STRENGTH OF TEMPERED GLASS SHEET ARTICLES

CROSS-REFERENCE TO RELATED APPLICATIONS

This application claims the benefit of priority under 35 U.S.C. §119(e) of U.S. Provisional Application Ser. No. 61/264,920, filed on Nov. 30, 2009.

BACKGROUND

In this disclosure, the term "tempered glass sheet article" is used to describe a glass article made from a tempered glass sheet. Similar, the term "glass sheet article" is used to describe a glass article made from a glass sheet. A glass sheet has a top surface, a bottom surface, and an edge connecting the top surface to the bottom surface. Tempering can be used to induce permanent compressive stress or compression on the surfaces of the glass sheet, thereby forming a tempered glass sheet. The depth of the surface layer under compression (also referred to as "depth of layer") at the surfaces is dependent on the tempering process and the material of the glass sheet. When force is applied to the tempered glass sheet, any tension induced near the glass surface will be reduced by the pre-existing compressive stress at the glass surface. Thus, greater force will be needed to break the tempered glass sheet article, i.e., compared to a glass sheet of the same shape and material that is initially free of such compressive stress. There are two ways of tempering glass: (i) thermal tempering; and (ii) ion-exchange, or chemical, tempering. Of these two ways of tempering glass, greater surface compression can be obtained using the ion-exchange method.

For an ion-exchanged glass sheet having sharp corners between the edge and surfaces of the glass sheet, the corners exhibit a shallower compressive layer depth, a lower surface compression, and a relatively high local tension or tensile stress, in comparison to those areas of the glass sheet that are far away from the corners. These areas of low compression will have a low breaking strength. The edge area adjacent to the sharp corners is significantly smaller than the surface area adjacent to the sharp corners. As a result, the low surface compression, shallow depth of the compressive layer, and high local tension at the sharp corners will disproportionately affect the edge of the glass sheet. In other words, the edge of the glass sheet will have a much lower breaking strength than the surfaces of the glass sheet article and will thus be the weakest part of the glass sheet.

If the edge of the tempered glass sheet has a low breaking strength, the tempered glass sheet as a whole will be vulnerable to damage because cracks can easily form at the edge (e.g., due to impact loading on or bending of the glass sheet article), and any crack formed at the edge will easily propagate across the glass sheet. Thus, the breaking strength of the edge of the tempered glass sheet essentially defines the breaking strength of the entire tempered glass sheet. One solution is to protect the edge of the tempered glass sheet article. However, this solution is not available in applications where the edge of the tempered glass sheet article must be exposed. For applications where the edge of the tempered glass sheet article will be exposed, and to take full advantage of the glass strengthening offered by tempering, it would be necessary to increase the breaking strength of the edge of the tempered glass sheet article, e.g., to be similar to the breaking strength of the surfaces of the tempered glass sheet article.

SUMMARY

According to one aspect of the present invention, a tempered glass sheet article is provided. The tempered glass sheet article comprises a glass sheet having a thickness t, at least one edge, and at least one surface, the at least one edge being connected to the at least one surface by an edge-to-surface corner. The edge-to-surface corner is rounded with a radius r and has a surface compression that is at least 78% of a surface compression measured at or near a center of the at least one surface.

This and other aspects of the present invention will be apparent from the following description and the appended claims.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
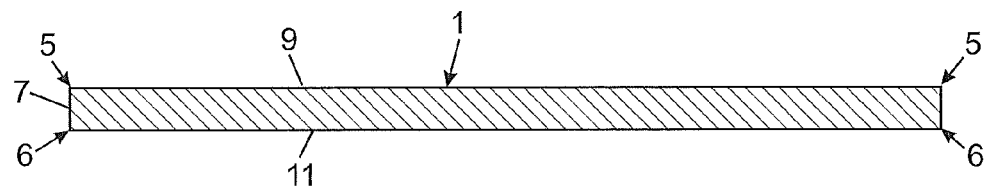
FIG. 1 is a cross-section of a prior art glass sheet with sharp edge-to-surface corners.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

Figure 2:
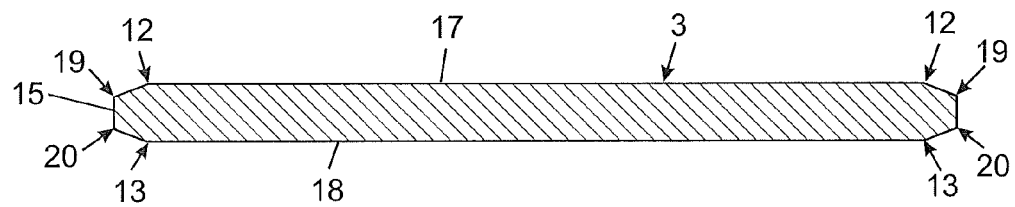
FIG. 2 is a cross-section of a prior art glass sheet with sharp edge-to-surface corners and sharp inner-edge corners.

The edge geometry of a glass sheet affects the distribution of compressive and tensile stresses at the edge of a tempered glass sheet article made from the glass sheet. As described herein, the edge breaking strength of the tempered glass sheet article can be improved by modifying the edge geometry of the glass sheet prior to tempering the glass sheet. The edge geometry of the glass sheet can be modified such that after tempering the glass sheet, the edge of the tempered glass sheet article has a high compression similar to the surfaces of the tempered glass sheet article. FIGS. 1 and 2 show examples of glass sheet geometries 1, 3 that can benefit from the present invention. In FIG. 1, the edge-to-surface corners 5, 6 formed between the edge 7 and surfaces 9, 11 of the glass sheet 1 are sharp. In FIG. 2, the edge-to-surface corners 12, 13 formed between the edge 15 and surfaces 17, 18 of the glass sheet 3 as well as the inner-edge corners 19, 20 formed on the edge are sharp. These sharp corners will exhibit a shallow depth of the layer under compression, low surface compressive stress, and high local tension. According to certain aspects of the present invention, the sharp edge-to-surface corners and inner-edge corners shown in FIGS. 1 and 2 will be rounded prior to tempering the glass sheet. During tempering, the stresses at the rounded corners will be favorably distributed, as will be further described below.

Figure 3:
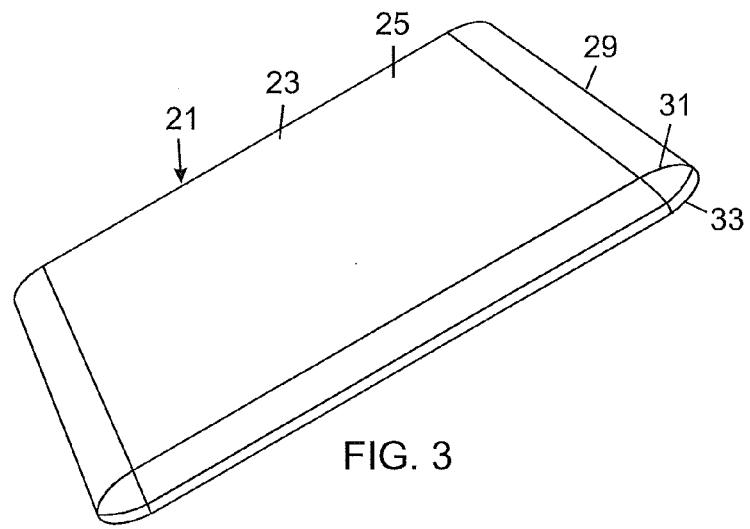
FIG. 3 is a perspective view of a tempered glass sheet article with rounded edge-to-surface corners.
Figures 4, 5:
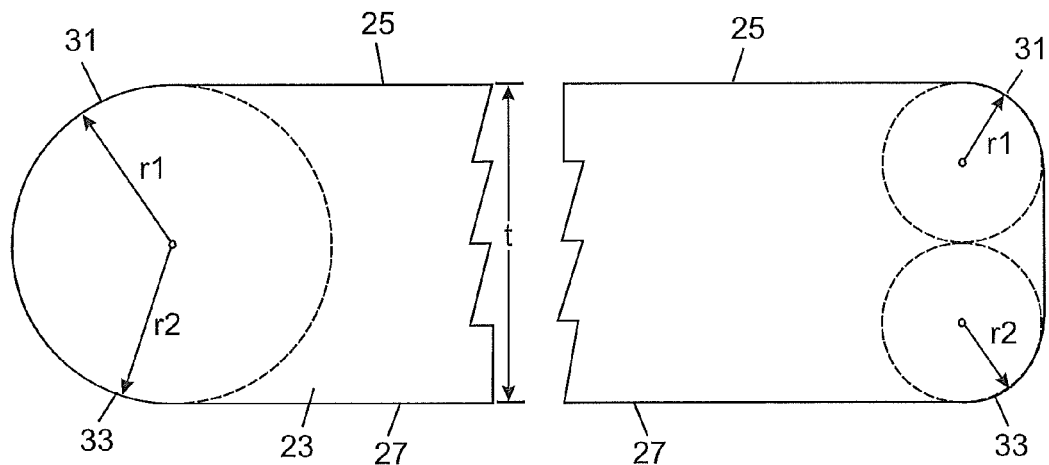
FIG. 4 is a cross-section of a portion of a tempered glass sheet article showing rounded edge-to-surface corners.
FIG. 5 is another cross-section of a portion of a tempered glass sheet article showing rounded edge-to-surface corners.

FIG. 3 shows a tempered glass sheet article 21 according to certain aspects of the present invention. The tempered glass sheet article 21 includes a glass sheet 23 having an upper surface 25, a lower surface (lower surface is opposite to the upper 25 and is shown as 27 in FIG. 4), and an edge 29 connecting the upper surface 25 to the lower surface 27. The edge 29 connects to the upper surface 23 at an edge-to-surface corner 31 and to the lower surface 27 at an edge-to-surface corner 33. FIGS. 4 and 5 show cross-sections of the edge-to-surface corners 29, 31. In FIGS. 4 and 5, the edge-to-surface corner 31 is rounded with radius r1, and the edge-to-surface corner 33 is rounded with radius r2. Typically, r1 is the same as r2, but it is also possible that r1 can be slightly larger than r2 or r2 slightly larger than r1. The radiuses r1, r2 in FIG. 4 are larger than the radiuses r1, r2 in FIG. 5. FIGS. 4 and 5 show how differently the edge-to-surface corners 31, 33 can appear depending on the value of r1, r2. In certain embodiments, r1, r2≧0.125 t, preferably 0.125 t≦r1, r2≦0.25 t, more preferably 0.125 t≦r1, r2≦0.5 t, where t is the thickness of the glass sheet 23 and is indicated in FIG. 4. In FIG. 4, r1, r2 are roughly equal to 0.5 t. In FIG. 5, r1, r2 are roughly equal to 0.25 t. The glass sheet 23 has been tempered, but the edge-to-surface corners 31, 33 are rounded prior to tempering the glass sheet 23. Rounding can involve techniques such as machining and polishing the edge-to-surface corners 31, 33. Tempering of the glass sheet 23 can be by thermal tempering or by ion-exchange (or chemical) tempering. As used herein, the term "glass sheet" is intended to cover a sheet of glass, glass-ceramic, or glass laminate. Where the glass sheet 23 is tempered by ion-exchange, the glass sheet 23 will have to be made of an ion-exchangeable material, as will be further described below.

Figure 6:
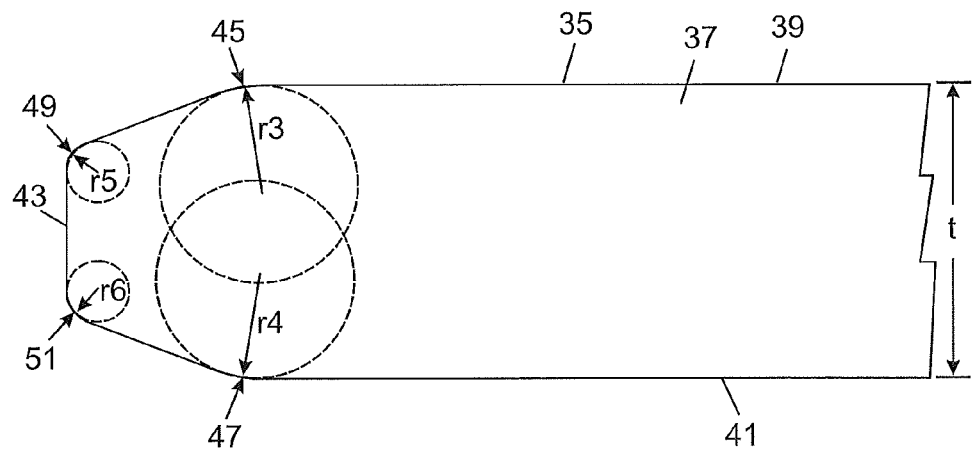
FIG. 6 is a cross-section of a portion of another tempered glass sheet article showing rounded edge-to-surface corners and rounded inner-edge corners.

FIG. 6 shows a cross-section of a tempered glass sheet article 35 according to certain aspects of the present invention. The tempered glass sheet article 35 includes a glass sheet 37 having an upper surface 39, a lower surface 41, and an edge 43 connecting the upper surface 39 to the lower surface 41. The edge 43 connects to the upper surface 39 at an edge-to-surface corner 45 and to the lower surface 41 at an edge-to-surface corner 47. The edge-to-surface corner 45 is rounded with radius r3, and the edge-to-surface corner 47 is rounded with radius r4. Typically, r3 and r4 are the same, but it is possible that r3 can be slightly larger than r4 or r4 can be slightly larger than r3. In certain embodiments, r3, r4≧0.125 t, preferably 0.125 t≦r3, r4≦0.25 t, more preferably 0.125 t≦r3, r4≦0.5 t, where t is the thickness of the glass sheet and is indicated in FIG. 6. There are also inner-edge corners 49, 51 with radiuses r5, r6. Radiuses r5, r6 may or may not be the same. The glass sheet 37 is tempered, but the edge-to-surface corners 45, 47 and inner-edge corners 49, 51 are rounded prior to tempering the glass sheet 37. Further, the glass sheet 37 can be made of the same materials as described above and tempered using the same processes described above.

Figure 7:
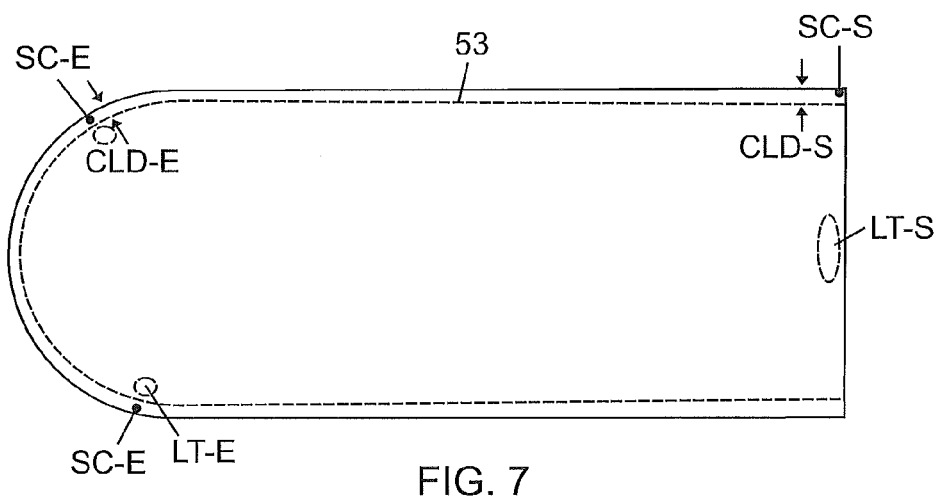
FIG. 7 is a geometry indicating locations of parameters related to compressive and tensile stresses in a tempered glass sheet article.
Figure 8:
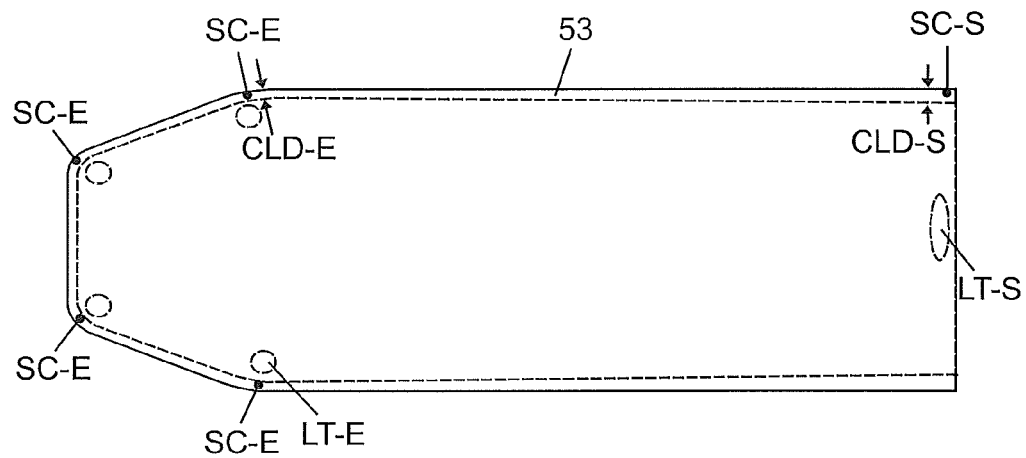
FIG. 8 is another geometry indicating locations of parameters related to compressive and tensile stresses in a tempered glass sheet article.

According to certain aspects of the present invention, the surface compression SC for a tempered glass sheet article at the edge of the article is similar to SC away from the edge, In FIGS. 7 and 8, SC-E represents the surface compression at an edge-to-surface corner or inner-edge corner of a tempered glass sheet article and SC-S represents the surface compression at or near the center of a surface of the tempered glass sheet article. The locations of SC-E and SC-S are indicated in FIG. 7 for a case where the edge-to-surface corners of the tempered glass sheet article are rounded. The locations of SC-E and SC-S are indicated in FIG. 8 for a case where the edge-to-surface corners and inner-edge corners of the tempered glass sheet article are rounded. In FIGS. 7 and 8, the dotted line 53 represents the surface region under compression, but the shape of the dotted line 53 is imaginary. Then, in certain embodiments, SC-E/SC-S for at least one of the rounded corners (whether edge-to-surface or inner-edge) is at least 62%, preferably in a range of 62% to 91%, more preferably in a range of 62% to 95%, and even more preferably in a range of 81% to 97% of the surface compression measured at the center of one of the surfaces of the tempered glass sheet article.

According to certain aspects of the present invention, the compressive layer depth CLD (i.e., the depth of the surface layer under compression (SC)) measured from the surface of the glass sheet into the glass sheet for a tempered glass sheet article at the edge is similar to CLD away from the edge, where "away from the edge" refers to a location that is further into the surface region of the tempered glass sheet article. In FIGS. 7 and 8, CLD-E represents the compression layer depth at an edge-to-surface corner or inner-edge corner of a tempered glass sheet article, and CLD-S represents the compression layer depth CLD at or near the center of a surface of the tempered glass sheet article. CLD-E and CLD-S are indicated in FIG. 7 for a case where the edge-to-surface corners of the tempered glass sheet article are rounded. CLD-E and CLD-S are indicated in FIG. 8 for a case where the edge-to-surface and inner-edge corners of the tempered glass sheet article are rounded. Then, in certain embodiments of the present invention, CLD-E/CLD-S for at least one of the rounded corners (edge-to-surface or edge) is at least 78%, preferably in a range of 78% to 89%, more preferably in a range of 78% to 95%, most preferably in a range of 78% to 95% of the CLD at or near the center of a surface of the tempered glass sheet article.

According to certain aspects of the invention, the local tension (or tensile stress) LT at the edge of a tempered glass sheet article is much less than LT away from the edge, where "away from the edge" refers to a location that is further into the surface region of the tempered glass sheet article. Another way of viewing this is that peak tensile stress in the tempered glass sheet article is located far from the edge. In FIGS. 7 and 8, LT-E represents local tension at an edge-to-surface corner or inner-edge corner of a tempered glass sheet article, and LT-S represents peak tension at or near the center of a surface of the tempered glass sheet article. The locations of LT-E and LT-S are indicated in FIG. 7 for a case where the edge-to-surface corners of the tempered glass sheet article are rounded. The locations of LT-E and LT-S are indicated in FIG. 8 for a case where the edge-to-surface corners and inner-edge corners of the tempered glass are rounded. Then, in certain embodiments, LT-E/LT-S for at least one of the rounded corners (whether edge-to-surface or inner-edge) is less than 6, preferably less than 5, more preferably less than 3, most preferably less than 1.

Table 1 below shows the effect of corner radius on CLD, SC, and LT at an edge-to-surface corner of a tempered glass sheet article, where any rounding of the edge-to-surface corner occurs before tempering of the glass sheet. Table 1 shows that the compression layer depth (CLD) and the surface compression (SC) at the edge-to-surface corner increase as the radius (r) of the edge-to-surface corner increases. In Table 1, t represents the thickness of the glass sheet. CLD-E, CLD-S, SC-E, SC-S, LT-E, and LT-S have been defined above. Table 1 also shows that local tension (LT) at the edge-to-surface corner decreases as radius of the edge-to-surface corner increases. Similar results are expected for an inner-edge corner that is rounded.

TABLE 1

| r/t | CLD-E/CLD-S | SC-E/SC-S | LT-E/LT-S |
|---|---|---|---|
| 0 | 0% | 0% | 8.8% |
| 0.013 | 0% | 0% | 8.1% |
| 0.067 | 78% | 62% | 5.85 |
| 0.13 | 78% | 81% | 3.3% |
| 0.27 | 89% | 91% | 1.7% |
| 0.40 | 95% | 95% | 1.1% |
| 0.50 | 98% | 97% | 0.9% |

A modeling study was carried out to investigate the benefits of the tempered glass sheet articles according to certain aspects of the present invention—the geometries indicated in FIG. 2 (sharp corners; comparative example) and FIG. 3 (rounded corners; one embodiment of the present invention) were compared. In the study, the thickness of the tempered glass sheet articles was 2 mm for both geometries shown in FIGS. 2 and 3, and r1, r2 for the geometry shown in FIG. 3 were the same and equal to 1 mm. Rounding of the corners in FIG. 3 was made prior to subjecting the glass sheet article of FIG. 3 to ion-exchange process modeling.

In the study, the tempered glass sheet articles were modeled under ion-exchange process conditions using finite element analysis (FEA). The finite element method is a computer numerical technique used for solving the differential equations of physics and engineering. The fundamental concept is that any physical quantity can be approximated by a set of piecewise functions defined over a finite number of subdomains called elements. The finite element method is commonly used, for example, to obtain approximate solutions of mechanical stress in objects. FEA generally includes creating the geometry needed for the FEA, and then creating a mesh for the geometry. A material property as well as appropriate initial conditions, boundary conditions, loadings, and constraints are applied to the mesh, and the FEA is then run. The results (deformation, stress, energy) are read and used to create the plots shown in FIGS. 9-12.

Figure 9:
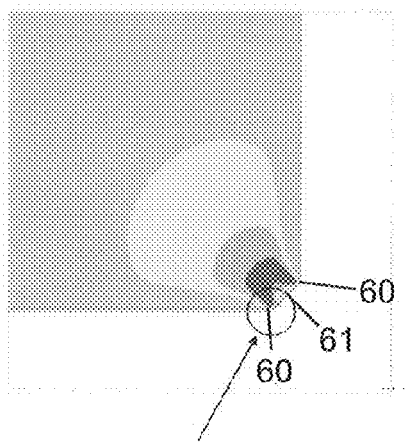
FIG. 9 shows calculated $1^{st}$ principal stress for the geometry of FIG. 2 under ion-exchange process conditions.
Figure 10:
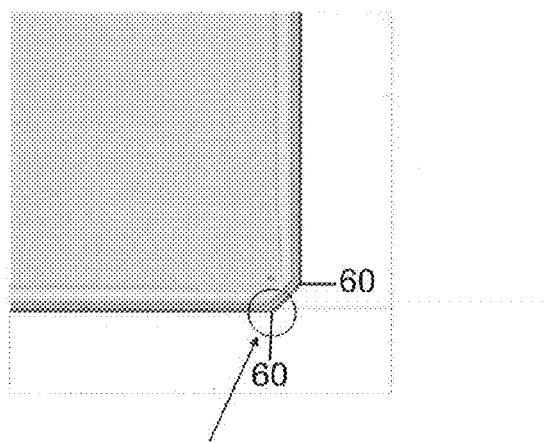
FIG. 10 shows calculated $3^{rd}$ principal stress for the geometry of FIG. 2 under ion-exchange process conditions.
Figure 11:
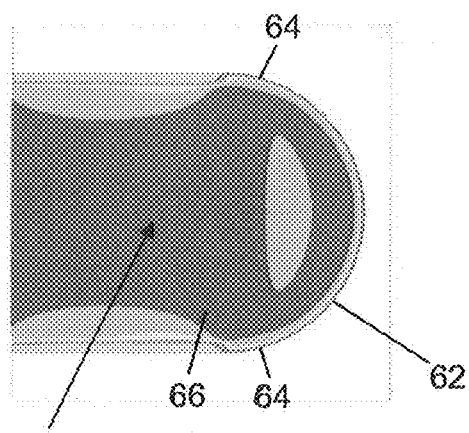
FIG. 11 shows calculated $1^{st}$ principal stress for the geometry of FIG. 3 under ion-exchange process conditions.
Figure 12:
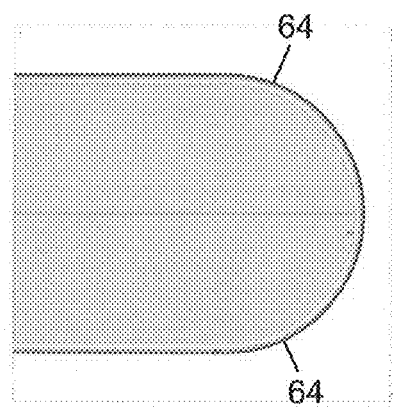
FIG. 12 shows calculated $3^{rd}$ principal stress for the geometry of FIG. 3 under ion-exchange process conditions.

FIGS. 9 and 10 show the calculated $1^{st}$ principal (maximum tensile) stress and $3^{rd}$ principal (maximum compression) stress, respectively, for the geometry of FIG. 2. In FIG. 9, there is very high tensile stress of about 145 MPa near the sharp corners 60. The stress distribution is not uniform on the edge 61. The presence of peak tensile stress near the sharp corners in FIG. 9 indicates that the edge of the geometry of FIG. 2 will be weak. In FIG. 10, the compression layer is made of compression sub-layers, with the outermost sub-layer having a compressive stress of 891 MPa and the innermost sub-layer having a compressive stress of 1 MPa. The compression layer has a shallow depth at the sharp corners. FIGS. 11 and 12 show the calculated $1^{st}$ principal (maximum tensile) stress and $3^{rd}$ principal (maximum compression) stress, respectively, for the geometry of FIG. 3. In FIG. 11, the tensile stresses are uniformly distributed over the edge 62. The highest tensile stress near the edge 62 is about 20 MPa. At the surface of the edge 62, the tensile stress is 0 MPa. At the edge-to-surface rounded corners 64, the high tension area 66 (i.e., with tensile stress of 20 MPa) is pushed away from the corners 64, into the surface region. This means that the rounded corners 64 do not see a concentration of high tension or tensile stress the same way that the sharp corners 60 see a concentration of high tension in FIG. 9. In FIG. 12, the compression layer is made of compression sub-layers, with the outermost sub-layer having a compressive stress of 891 MPa and the innermost sub-layer having a compressive stress of 1 MPa. However, unlike the comparative example shown in FIG. 10, there is no thinning out of the compression layer at the rounded corners 64, i.e., the thickness of the compression layer is essentially uniform. Thus, surface compression in the tempered glass sheet articles having rounded corners as described herein is more uniformly distributed at the edge. Tension is also more uniformly distributed near the edge, and high tension or tensile stress is pushed away from the edge. All of these factors contribute to improvement in the breaking strength of the edge.

In general, the ion-exchange process causes a slight expansion in glass. Where two surfaces meet at a sharp corner, this expansion acts to push the sharp corner away from the body of the glass object. This results in lower surface compression and shallower compressive layer at the sharp corner, compared to the surfaces away from the sharp corner. It also results in a region of high internal tension acting along a line bisecting the two surfaces and passing through the sharp corner. In certain aspects of the present invention, these effects of high internal or central tension, low surface compression, and shallow compressive layer at the edge are reduced by simply eliminating the sharp corner at the edge. The sharp corner is eliminated by rounding it, as demonstrated in, for example, FIGS. 3 and 6.

In certain aspects of the present invention, the tempered glass sheet article is made of an ion-exchangeable glass, e.g., an alkali-containing glass capable of being strengthened by ion-exchange. The ion-exchangeable glass has a structure that initially contains small alkali ions, such as $Li^+$, $Na^+$ or both, that can be exchanged for larger alkali ions, such as $K^+$, during an ion-exchange process. Examples of suitable ion-exchangeable glasses are alkali-aluminosilicate glasses such as those described in U.S. patent application Ser. Nos. 11/888,213, 12/277,573, 12/392,577, 12/393,241, and 12/537,393; U.S. Provisional Patent Application Nos. 61/235,767 and 61/235,762 (all assigned to Corning Incorporated), the contents of which are incorporated herein by reference in their entirety. These glasses can be ion-exchanged at relatively low temperatures and to a depth of at least 30 µm. In one embodiment, the alkali-containing glass comprises: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides. In another embodiment, the alkali-containing glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In yet another embodiment, the alkali-containing glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %$\leq Li_2O+Na_2O+K_2O \leq 20$ mol % and 0 mol %$\leq MgO+CaO \leq 10$ mol %. In still another embodiment, the alkali-containing glass comprises: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % MgO; and 0-5 mol % CaO, wherein: 66 mol %$\leq SiO_2+B_2O_3+CaO \leq 69$ mol %; $N_{a2}O+K_2O+B_2O_3+MgO+CaO+SrO>10$ mol %; 5 mol %$\leq MgO+CaO+SrO \leq 8$ mol %; $(Na_2O+B_2O_3)-Al_2O_3 \leq 2$ mol %; 2 mol %$\leq Na_2O-Al_2O_3 \leq 6$ mol %; and 4 mol %$\leq (Na_2O+K_2O)-Al_2O_3 \leq 10$ mol %.

In those instances where the tempered glass sheet article is tempered by ion exchange, ions in the surface layer of the glass are replaced by—or exchanged with—larger ions having the same valence or oxidation state. In those embodiments in which the glass article comprises, consists essentially of, or consists of an alkali aluminosilicate glass, ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes typically comprise immersing a glass article in a molten salt bath containing the larger ions to be exchanged with the smaller ions in the glass. It will be appreciated by those skilled in the art that parameters for the ion exchange process including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass to be achieved by the strengthening operation. By way of example, ion exchange of alkali metal-containing glasses may be achieved by immersion in at least one molten salt bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 µm up to at least 50 µm with a compressive stress ranging from about 200 MPa up to about 800 MPa, and a central tension of less than about 100 MPa.

A non-limiting example of a process for strengthening glass by ion-exchange is described in U.S. Pat. No. 5,674,790 (Araujo, Roger J.). The ion-exchange process typically occurs at an elevated temperature range that does not exceed the transition temperature of the glass. The process is carried out by immersing the glass in a molten bath containing an alkali salt (typically a nitrate) with ions that are larger than that of the host alkali ions in the glass. The host alkali ions are exchanged for the larger alkali ions. For example, a glass containing $Na^+$ may be immersed in a bath of molten potassium nitrate ($KNO_3$). The larger $K^+$ present in the molten bath will replace the smaller $Na^+$ in the glass. The presence of the larger alkali ions at sites formerly occupied by small alkali ions creates a compressive stress at or near the surface of the glass and tension in the interior of the glass. The glass is removed from the molten bath and cooled down after the ion-exchange process. The ion-exchange depth, i.e., the penetration depth of the invading larger alkali ions into the glass, is typically on the order of 40 µm to 300 µm and is controlled by the glass composition and immersion time. When the ion-exchange process is properly executed, a scratch-resistant glass surface can be formed.

Tempered glass sheet articles having rounded inner-edge corners, as described above, have an improved edge strength over their counterpart with sharp inner-edge corners. Typical applications of the tempered glass sheet articles include cover glass for displays in handheld electronic devices, touch screen or display cover glass in desktop electronic devices, architectural glass (windows), and any other application where a high breaking strength of glass is desired. It should be noted that although in FIGS. 3 and 4 the glass sheet is shown as flat, the present invention is not limited to such flat glass sheet. The surfaces of the glass sheet could be curved, for example, and the edge would simply connect the curved surfaces through rounded corners as explained above. A method for making the tempered glass sheet article would generally involve providing a glass sheet having sharp corners. The glass sheet can be made using any suitable process, e.g., down-draw, fusion, float glass processes, or the like. The sharp corners would then be rounded as described above. Techniques such as machining, polishing and grinding may be used to form the rounded corners. After forming the rounded corners, the glass sheet would be tempered via thermal tempering or ion-exchange (or chemical) tempering.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tempered glass sheet article, comprising:
a glass sheet having a thickness t, at least one edge, and at least one surface, the at least one edge being connected to the at least one surface by an edge-to-surface corner, the edge-to-surface corner being rounded with a radius r and having a surface compression that is at least 78% of a surface compression measured at or near a center of the at least one surface.

2. The tempered glass sheet article of claim 1, wherein $0.125 \leq r \leq 0.5$ t.

3. The tempered glass sheet article of claim 1, wherein the glass sheet is made of glass, glass-ceramic, or glass laminate.

4. The tempered glass sheet article of claim 1, which is tempered by ion-exchange or chemical tempering.

5. The tempered glass sheet article of claim 1, wherein the edge-to-surface corner has a compression layer depth that is at least 62% of a compression layer depth measured at or near a center of the at least one surface.

6. The tempered glass sheet article of claim 1, wherein the at least one edge has inner-edge corners, and the inner-edge corners are rounded.

7. The glass sheet article of claim 1, wherein the glass sheet is made of an alkali-containing glass.

8. The glass sheet article of claim 7, wherein the alkali-containing glass comprises: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides.

9. The glass sheet article of claim 7, wherein the alkali-containing glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

10. The glass sheet article of claim 7, wherein the alkali-containing glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq$ MgO+CaO $\leq$ 10 mol %.

* * * * *